| (12) | United States Patent | (10) Patent No.: | US 8,124,221 B2 |
|---|---|---|---|
| | Uschold et al. | (45) Date of Patent: | *Feb. 28, 2012 |

(54) CROSSLINKABLE VINYL FLUORIDE COPOLYMER COATED FILM AND PROCESS FOR MAKING SAME

(75) Inventors: Ronald Earl Uschold, West Chester, PA (US); Jian Wang, Shizuoka (JP); Masahiro Yamamoto, Shizuoka (JP)

(73) Assignees: E. I. du Pont de Nemours and Company, Wilmington, DE (US); Dupont-Mitsui Flourochemicals Co Ltd, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 11/962,135

(22) Filed: Dec. 21, 2007

(65) Prior Publication Data

US 2008/0156367 A1    Jul. 3, 2008

Related U.S. Application Data

(60) Provisional application No. 60/876,442, filed on Dec. 21, 2006, provisional application No. 60/964,085, filed on Aug. 9, 2007.

(51) Int. Cl.
C08F 14/20 (2006.01)
B32B 7/04 (2006.01)
B32B 27/28 (2006.01)
B32B 27/34 (2006.01)
B32B 27/36 (2006.01)

(52) U.S. Cl. ........ 428/215; 428/213; 428/332; 428/337; 428/339; 428/421; 428/473.5; 428/474.4; 428/476.3; 428/482; 428/483; 428/522; 526/242; 526/243; 526/245; 526/248; 526/249; 526/250

(58) Field of Classification Search .................. None
See application file for complete search history.

(56) References Cited

U.S. PATENT DOCUMENTS

| 2,409,948 | A | | 10/1946 | Martin | |
|---|---|---|---|---|---|
| 2,419,008 | A | | 4/1947 | Coffman et al. | |
| 2,419,009 | A | | 4/1947 | Coffman et al. | |
| 2,468,664 | A | | 4/1949 | Hanford el al. | |
| 2,510,783 | A | | 6/1950 | Johnston et al. | |
| 2,559,752 | A | | 7/1951 | Berry | |
| 2,559,300 | A | | 6/1952 | Upson | |
| 3,087,827 | A | | 4/1963 | Klenke, Jr. et al. | |
| 3,087,828 | A | | 4/1963 | Linton | |
| 3,087,829 | A | | 4/1963 | Linton | |
| 3,133,854 | A | | 5/1964 | Simms | |
| 3,318,850 | A | | 5/1967 | Stilmar | |
| 3,360,396 | A | * | 12/1967 | Kennedy et al. | 427/375 |
| 3,513,116 | A | | 5/1970 | Sianesi et al. | |
| 3,524,906 | A | | 8/1970 | Schmitt et al. | |
| 3,531,441 | A | | 9/1970 | Stilmar | |
| 3,581,779 | A | * | 6/1971 | Sylvia, Jr. | 138/141 |
| 3,895,029 | A | | 7/1975 | Ward | |
| 4,183,837 | A | * | 1/1980 | Tamura et al. | 524/108 |
| 4,273,829 | A | | 6/1981 | Perreault | |
| 4,341,685 | A | * | 7/1982 | Miyake et al. | 524/104 |
| 4,385,150 | A | * | 5/1983 | Miyake et al. | 524/389 |
| 4,557,977 | A | | 12/1985 | Memmer et al. | |
| 4,581,412 | A | * | 4/1986 | Ohmori et al. | 525/199 |
| 4,634,754 | A | * | 1/1987 | Ohmori et al. | 526/242 |
| 4,659,768 | A | | 4/1987 | Tortorello et al. | |
| 4,745,165 | A | | 5/1988 | Arcella et al. | |
| 4,786,546 | A | * | 11/1988 | Vassiliou | 428/215 |
| 4,877,683 | A | * | 10/1989 | Bragaw et al. | 428/421 |
| 4,931,324 | A | | 6/1990 | Ellison et al. | |
| 4,959,189 | A | * | 9/1990 | Rohrbacher et al. | 264/510 |
| 5,053,469 | A | * | 10/1991 | Tatemoto et al. | 526/242 |
| 5,059,720 | A | | 10/1991 | Hung | |
| 5,085,939 | A | * | 2/1992 | Wenz et al. | 428/411.1 |
| 5,139,878 | A | | 8/1992 | Kim et al. | |
| 5,169,915 | A | * | 12/1992 | Mohri et al. | 526/247 |
| 5,225,260 | A | * | 7/1993 | McNaul et al. | 428/40.7 |
| 5,238,519 | A | * | 8/1993 | Nath et al. | 156/382 |
| 5,250,597 | A | * | 10/1993 | Uschold | 524/280 |
| 5,688,884 | A | | 11/1997 | Baker et al. | |
| 5,707,697 | A | | 1/1998 | Spain et al. | |
| 5,804,650 | A | | 9/1998 | Tsuda et al. | |
| 5,846,650 | A | * | 12/1998 | Ko et al. | 428/336 |
| 5,969,067 | A | | 10/1999 | Brothers et al. | |

(Continued)

FOREIGN PATENT DOCUMENTS

CN        1 657 579        8/2005

(Continued)

OTHER PUBLICATIONS

Sianesi, Dario et al, "Polymerization and Copolymerization Studies on Vinyl Fluoride", Journal of Polymer Science: Part A1, vol. 6, 335-352 (1968).

(Continued)

Primary Examiner — Vivian Chen

(57) ABSTRACT

The invention provides a fluoropolymer coated film comprising:
  a polymeric substrate film; and
  a fluoropolymer coating on the polymeric substrate film, the fluoropolymer coating comprising a vinyl fluoride copolymer comprised of about 40 to about 90 mole % of repeat units derived from vinyl fluoride and about 10 to about 60 mole % of repeat units derived from monomer selected from the group consisting of (a) and (b) below and mixtures thereof, with the proviso that about 0.1 mole % to 50 mole % of repeat units in the copolymer are derived from monomer selected from (b):
    (a) monomer selected from the group consisting of, tetrafluoroethylene, trifluoroethylene, chlorotrifluoroethylene and mixtures thereof; and
    (b) vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide,
wherein the polymeric substrate film comprises functional groups that interact with the functional groups of the vinyl fluoride copolymer to promote bonding of the fluoropolymer coating to the polymeric substrate film.

21 Claims, No Drawings

U.S. PATENT DOCUMENTS

| | | | |
|---|---|---|---|
| 6,060,158 A | 5/2000 | Ono et al. | |
| 6,080,487 A | 6/2000 | Coggio et al. | |
| 6,107,423 A * | 8/2000 | Wheland et al. | 526/249 |
| 6,150,426 A * | 11/2000 | Curtin et al. | 521/28 |
| 6,177,196 B1 | 1/2001 | Brothers et al. | |
| 6,242,547 B1 | 6/2001 | Uschold | |
| 6,271,303 B1 | 8/2001 | Uschold | |
| 6,383,620 B1 | 5/2002 | Aoyama et al. | |
| 6,387,570 B1 | 5/2002 | Nakamura et al. | |
| 6,403,740 B1 | 6/2002 | Uschold | |
| 6,479,161 B1 * | 11/2002 | Araki et al. | 428/515 |
| 6,479,578 B2 * | 11/2002 | Araki et al. | 524/517 |
| 6,632,518 B1 | 10/2003 | Schmidt et al. | |
| 6,710,123 B1 * | 3/2004 | Amin-Sanayei et al. | 524/805 |
| 6,794,027 B1 * | 9/2004 | Araki et al. | 428/336 |
| 6,833,414 B2 * | 12/2004 | Granel et al. | 525/479 |
| 7,112,363 B2 * | 9/2006 | Moya | 428/304.4 |
| 7,270,870 B2 | 9/2007 | Hetzler et al. | |
| 7,288,600 B2 * | 10/2007 | Moya | 525/326.2 |
| 7,553,540 B2 * | 6/2009 | Debergalis et al. | 428/335 |
| 2002/0012801 A1 | 1/2002 | Oreins et al. | |
| 2002/0151665 A1 * | 10/2002 | Uschold | 526/255 |
| 2003/0087103 A1 | 5/2003 | Belmares et al. | |
| 2004/0059033 A1 | 3/2004 | Toriumi | |
| 2004/0192828 A1 * | 9/2004 | Mitsuhata et al. | 524/544 |
| 2005/0158558 A1 | 7/2005 | Hayashida et al. | |
| 2006/0148350 A1 | 7/2006 | Chang et al. | |
| 2006/0148971 A1 | 7/2006 | Jing et al. | |
| 2006/0199029 A1 | 9/2006 | Liu et al. | |
| 2006/0234038 A1 | 10/2006 | Kernander et al. | |
| 2006/0280922 A1 | 12/2006 | Hull et al. | |
| 2007/0060708 A1 * | 3/2007 | Wang et al. | 525/199 |
| 2008/0149887 A1 * | 6/2008 | Wang et al. | 252/182.1 |
| 2008/0154004 A1 * | 6/2008 | Uschold et al. | 526/255 |

FOREIGN PATENT DOCUMENTS

| | | | |
|---|---|---|---|
| EP | 0 199 138 | | 2/1989 |
| EP | 0 467 570 A2 | | 1/1992 |
| FR | 2 654 736 | | 5/1991 |
| GB | 1 395 432 | | 5/1975 |
| JP | 57-037711 | | 3/1982 |
| JP | 61107009 | | 5/1986 |
| JP | 2-151608 | | 6/1990 |
| JP | 2-170855 | | 7/1990 |
| JP | 3-212411 | | 9/1991 |
| JP | 3-294347 | | 12/1991 |
| JP | 6-211945 | | 8/1994 |
| JP | 07-070508 | * | 3/1995 |
| JP | 7118348 | | 5/1995 |
| JP | 1995118348 A | | 5/1995 |
| JP | 10-138264 | | 5/1998 |
| JP | 11-309830 | | 11/1999 |
| JP | 2000-301053 | | 10/2000 |
| JP | 2001-315274 | * | 11/2001 |
| JP | 3440963 B2 | | 8/2003 |
| JP | 3467499 B2 | | 11/2003 |
| JP | 3501113 B2 | | 3/2004 |
| JP | 2004079327 A | | 3/2004 |
| JP | 2006-031051 A | | 2/2006 |
| JP | 2006-169328 | | 6/2006 |
| WO | 97/49777 | | 12/1997 |
| WO | 98/46657 | | 10/1998 |
| WO | 98/46658 | | 10/1998 |
| WO | 2006/086081 A1 | | 8/2006 |
| WO | WO 2007/009140 A1 | | 1/2007 |

OTHER PUBLICATIONS

Non-Final Office Action, U.S. Appl. No. 11/962,134, Dated Nov. 16, 2009.

* cited by examiner

CROSSLINKABLE VINYL FLUORIDE COPOLYMER COATED FILM AND PROCESS FOR MAKING SAME

The present application claims benefit of Provisional Application No. 60/876,442, filed Dec. 21, 2006, and claims benefit of Provisional Application No. 60/964,085, filed Aug. 9, 2007.

BACKGROUND OF THE INVENTION

The present invention relates to crosslinkable vinyl fluoride copolymer coated film and a process for making crosslinkable vinyl fluoride copolymer coated film Photovoltaic (PV) cells are used to produce electrical energy from sunlight, offering a more environmentally friendly alternative to traditional methods of electricity generation. Photovoltaic (PV) cells are built from various semiconductor systems which must be protected from environmental effects such as moisture, oxygen, and UV light. The cells are usually jacketed on both sides by encapsulating layers of glass and/or plastic films forming a multilayer structure known as a photovoltaic module. Fluoropolymer films are recognized as an important component in photovoltaic modules due to their excellent strength, weather resistance, UV resistance, and moisture barrier properties. Especially useful in these modules are film composites of fluoropolymer film and polymeric substrate film which act as a back sheet for the module. Such composites have traditionally been produced from preformed films of fluoropolymer, specifically polyvinyl fluoride (PVF), adhered to polyester substrate film, specifically polyethylene terephthalate. When fluoropolymer such as PVF is used as a backsheet for the PV module, its properties significantly improve the module life, enabling module warranties of up to 25 years. Fluoropolymer backsheets are frequently employed in the form of a laminate with polyethylene terephthalate (PET) films, typically with the PET sandwiched between two PVF films.

However, laminates of preformed fluoropolymer films on polymeric substrates having a bond which will not delaminate after years of outdoor exposure are difficult to make. Prior art systems such as U.S. Pat. No. 3,133,854 to Simms, U.S. Pat. No. 5,139,878 to Kim, et al. and U.S. Pat. No. 6,632,518 to Schmidt et al. describe primers and adhesives for preformed films that will produce durable laminate structures. However, these processes require the application of at least one adhesive layer, or both a primer and an adhesive layer, prior to the actual lamination step. The lamination step then requires the application of heat and pressure to form the laminate. Therefore, prior art laminates using preformed fluoropolymer films are expensive to manufacture and/or require capital intensive equipment. Because preformed fluoropolymer films must have sufficient thickness to provide strength for handling during manufacture and subsequent processing, the resulting laminates may also incorporate thick layers of fluoropolymer, i.e., thicker than are necessary for an effective protective layer.

BRIEF SUMMARY OF THE INVENTION

The invention provides a fluoropolymer coated film comprising:
a polymeric substrate film; and
a fluoropolymer coating on the polymeric substrate film, the fluoropolymer coating comprising a vinyl fluoride copolymer comprised of about 40 to about 90 mole % of repeat units derived from vinyl fluoride and about 10 to about 60 mole % of repeat units derived from monomer selected from the group consisting of (a) and (b) below and mixtures thereof, with the proviso that about 0.1 mole % to 50 mole % of repeat units in the copolymer are derived from monomer selected from (b):
(a) monomer selected from the group consisting of, tetrafluoroethylene, trifluoroethylene, chlorotrifluoroethylene and mixtures thereof; and
(b) vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide,
wherein the polymeric substrate film comprises functional groups that interact with the functional groups of the vinyl fluoride copolymer to promote bonding of the fluoropolymer coating to the polymeric substrate film.

Preferably, in the fluoropolymer coated film in accordance with the invention, the vinyl fluoride copolymer coating is cross-linked.

In a preferred fluoropolymer coated film, the vinyl fluoride copolymer further comprises about 0.1 to about 10 mole % of repeat units derived from monomer (c) selected from the group consisting of fluorinated vinyl ethers, fluorinated alkyl (meth)acrylates, perfluoroolefins having 3-10 carbon atoms, perfluoro C1-C8 alkyl ethylenes, fluorinated dioxoles and mixtures thereof.

In accordance with a preferred form of the invention, monomer (a) comprises tetrafluoroethylene. In a preferred embodiment of this form of the invention, the vinyl fluoride copolymer further comprises about 0.1 to about 10 mole % units derived from at least one monomer selected from highly fluorinated vinyl ethers and perfluoro C1-C8 alkyl ethylenes.

In accordance with a preferred form of the fluoropolymer coated film of the invention, the polymeric substrate film is selected from polyester, polyamide, and polyimide, and more preferably is polyester.

In accordance with a preferred embodiment of the invention, a photovoltaic module is provided which comprises the fluoropolymer coated film of the invention as a backsheet.

The invention also provides a process for forming a fluoropolymer coated film comprising:
coating a polymeric substrate film with a liquid fluoropolymer coating composition, wherein the liquid fluoropolymer coating composition comprises a liquid medium and dispersed or dissolved vinyl fluoride copolymer comprised of about 40 to about 90 mole % of repeat units derived from vinyl fluoride and about 10 to about 60 mole % of repeat units derived from monomer selected from the group consisting of (a) and (b) below and mixtures thereof, with the proviso that about 0.1 mole % to 50 mole % of repeat units in the copolymer are derived from monomer selected from (b):
(a) monomer selected from the group consisting of, tetrafluoroethylene, trifluoroethylene, chlorotrifluoroethylene and mixtures thereof; and
(b) vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide, and removing the liquid medium from the fluoropolymer coating.

In a preferred process of the invention, the liquid fluoropolymer coating composition further comprises cross-linking agent and the process further comprises crosslinking the vinyl fluoride copolymer.

DETAILED DESCRIPTION OF THE INVENTION

Vinyl Fluoride Compolymers

The vinyl fluoride copolymer employed in the invention comprises:

about 40 to about 90 mole % of repeat units derived from vinyl fluoride; and about 10 to about 60 mole % of repeat units derived from monomer selected from the group consisting of (a) and (b) below and mixtures thereof, with the proviso that about 0.1 mole % to 50 mole % of repeat units in the copolymer are derived from monomer selected from (b):

(a) monomer selected from the group consisting of, tetrafluoroethylene, trifluoroethylene, chlorotrifluoroethylene and mixtures thereof; and (b) vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide.

Preferred vinyl fluoride copolymers further comprise about 0.1 to about 10 mole % of repeat units derived from monomer (c) selected from the group consisting of fluorinated vinyl ethers, fluorinated alkyl (meth)acrylates, perfluoroolefins having 3-10 carbon atoms, perfluoro C1-C8 alkyl ethylenes, fluorinated dioxoles and mixtures thereof.

The amounts of monomer units within the stated ranges can be varied to adjust the properties of the polymer as desired. Vinyl fluoride (VF) can be varied within the range of about 40 to about 90 mole %, to adjust the properties of the polymer. For example, VF generally provides copolymers with lower solubility in organic solvents than a polymer which is otherwise the same but containing VdF. When it is desired to improve weatherability, chemical resistance, and thermal stability, it is generally desirable to decrease VF content and increase the quantity of monomers which have higher fluorine content than VF. Preferably, the vinyl fluoride-based copolymer used in the practice of the present invention comprises 50 to 80% by mole of a structural units derived from vinyl fluoride (VF).

A copolymer for use in the invention comprises about 10 to about 60 mole % of repeat units derived from monomer selected from the group consisting of (a) and (b) and mixtures thereof, preferably, about 20 to about 50 mole %. Preferably, monomer (b) and/or monomer (c), if used, introduce into the polymer a side chain of at least one carbon atom. Monomers which provide the side chain of at least one carbon atom can improve solubility of the copolymer in organic solvents.

Monomer (a) is selected from the group consisting of, tetrafluoroethylene, trifluoroethylene, chlorotrifluoroethylene, and mixtures thereof. The monomer chosen and the amount employed can increase the fluorine content of the polymer and can also influence the solubility of the polymer in organic solvent. For example, a preferred monomer (a) is tetrafluoroethylene (TFE) and preferred vinyl fluoride copolymers of the invention preferably comprise at least about 30 mole % units derived from tetrafluoroethylene. Tetrafluoroethylene is a preferred monomer because of low cost and high fluorine content. A high content of —CF$_2$CF$_2$— segments in the copolymer provides improved weatherability, chemical resistance and thermal stability but may decrease solubility in organic solvents.

Preferred vinyl fluoride copolymers further comprise about 0.1 to about 10 mole % of repeat units derived from monomer (c) selected from the groups consisting of fluorinated vinyl ethers, fluorinated alkyl (meth)acrylates, perfluoroolefins having 3-10 carbon atoms, perfluoro C1-C8 alkyl ethylenes, fluorinated dioxoles and mixtures thereof. Monomers of this type which introduce into the copolymer a side chain of at least one carbon atom generally will improve solubility of the copolymer in organic solvents. Especially preferred for monomer (c) are perfluoroolefins having 3-10 carbon atoms, perfluoro C1-C8 alkyl ethylenes, and fluorinated vinyl ethers, most preferably, highly fluorinated vinyl ethers and perfluoro C1-C8 alkyl ethylenes are used.

The monomer (b) is a vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide. Preferably, monomer (b) also introduces a side chain into the copolymer of at least one carbon atom. The functional groups of monomer (b) provide a cross-linkable reaction site and the introduced functional group (and side chain if present) may also improve the solubility of the copolymer in organic solvents to improve processability of the vinyl fluoride copolymer used in the practice of the invention. In the copolymer in accordance with the invention, units derived from monomer (b) are present in an amount of about 0.1 mole % to 50 mole %, preferably about 0.1 mole % to about 40 mole %, and more preferably, about 0.2 mole % to 30 mole %, and most preferably, about 0.2 mole % to about 20 mole %. The ability of the various vinyl monomers with functional groups to form cross-links and adjust solubility characteristics will vary with the particular monomer(s) employed so sufficient quantity of such monomers should be employed to provide the desired effect.

Preferably, to increase fluorine content of the copolymer, monomer (b) comprises fluorinated vinyl monomer containing at least one functional group. More preferably, monomer (b) is a fluorinated vinyl ether monomer containing at least one functional group. Fluorinated vinyl ether monomers of this type are disclosed in Hung, U.S. Pat. No. 5,059,720, Brothers et al., U.S. Pat. No. 5,969,067 and Brothers et al., U.S. Pat. No. 6,177,196. One particular useful monomer disclosed in Hung, U.S. Pat. No. 5,059,720, is 9,9-dihydro-9-hydroxy-perfluoro(3,6-dioxa-5-methyl-1-nonene), referred to hereinafter as (EVE-OH).

In one preferred copolymer for use in this invention, the copolymer comprises units derived from about 40 to about 70 mole % VF, about 15 to about 29.9 mole % of monomers selected from (a), about 0.1 to about 15 mole % of at least one (b) vinyl monomer containing at least one functional group, and about 0.1 to about 10 mole % of at least one monomer (c). For example, a preferred vinyl fluoride copolymer having hydroxy functional groups is obtained by copolymerizing VF, monomer (a) being TFE, monomer (b) being EVE-OH, and monomer (c) being fluorinated vinyl ether and/or perfluorobutylethylene (PFBE) within the ranges stated above.

The vinyl fluoride copolymer may be produced by any of a variety of suitable polymerization methods such as such as emulsion polymerization, suspension polymerization, solution polymerization and bulk polymerization. Emulsion polymerization is desirable because of high degree of polymerization, low cost, and because polymer in dispersion is produced which is advantageous for many end uses. Emulsion polymerization can be carried out in water using a water-soluble free-radical polymerization initiator in the presence of a suitable surfactant, typically a fluorosurfactant such as ammonium perfluorooctanoate as described in Berry, U.S. Pat. No. 2,559,752 or 6,2 TBS as described in Baker et al., U.S. Pat. No. 5,688,884, or other suitable surfactant. Polymerization temperatures of about 40° C. to 150° C. are suitable, preferably 60° C. to 100° C. and pressures of about 1 MPa to 12 MPa (145 psi to 1,760 psi) may be used. If desired, a buffering agent such as phosphate, carbonate and acetate can be used for controlling pH of the latex.

A wide variety of polymerization initiators may be used for producing the vinyl fluoride copolymer used in accordance with the present invention. Preferred initiators include organic azo-type initiators such as 2,2'-azobis(2-amidinopropane)dihydrochloride and 2,2'-azobis(N,N-dimethyleneisobutyroamidine)dihydrochloride, and water-soluble salts of inorganic peracids such as alkali metal or ammonium salts of persulfuric acid. Further, a chain transfer agent is optionally used if necessary in the polymerization reaction to adjust molecular weight of the vinyl fluoride-based copolymer. Preferred chain transfer agents include ethane, cyclohexane, methanol, isopropanol, ethyl malonate and acetone and the like.

When emulsion aqueous emulsion polymerization is used to make the vinyl fluoride copolymer, an aqueous dispersion of the copolymer is produced. If desired, the aqueous dispersions produced by emulsion polymerization, can be subsequently stabilized by addition of surfactant, typically nonionic surfactant, and optionally concentrated to increase solids content. Aqueous liquid fluoropolymer coating compositions in accordance with the invention can be made from such dispersions. Alternatively, the copolymer can be isolated from the dispersion to produce copolymer resin by any of a variety of known techniques such as strong agitation, increasing the ionic strength, freezing and thawing, and combinations thereof. Non-aqueous liquid fluoropolymer coating compositions in accordance with the invention can be produced by dispersing or dissolving the copolymer resin in a suitable organic liquid. Organic liquids which are useful for making organic liquid dispersions and solutions of the copolymer are, for example, polar organic solvents such as N-methyl-2-pyrrolidone (NMP) and propylene carbonate, γ-butyrolactone, dimethylacetamide, dimethylsulfoxide, methylethyl ketone (MEK) and tetrahydrofuran (THF). For the production of dispersions, grinding or milling of the dispersion may be necessary for the production of dispersion suitable for the intended purpose.

Preferably in the practice of the present invention, crosslinking agents are employed. Crosslinking agents are preferably added to the aqueous or non-aqueous liquid fluoropolymer coating compositions. Crosslinking agents include alcohols, phenols, thiols, peroxides, amines, azo compounds, carboxylic acids, carboxylic esters, acid anhydrides, sulfonic acids, sulfonic esters, phosphoric acids, phosphoric esters, boric acids, boric esters, epoxies, isocyanates, thiocyanates, nitriles, melamines, aldehydes, sulfide compounds, silane compounds, metal oxides, halogen compounds and organic metal compounds.

Generally, crosslinkable fluoropolymer coating compositions in accordance with the invention are employed similarly to other cross-linkable compositions as are known in the art and are especially useful as in the production fluoropolymer coated films in accordance with the invention. The crosslinking agent employed in the composition is preferably soluble in the coating composition medium and is reactive with the types of functional groups provided in the copolymer my monomer (b). Typically, the composition will be applied to the polymeric film substrate and heated to remove the liquid medium. If the copolymer is in dispersion form, heating may also be needed to coalesce the copolymer. Heating can be continued to promote reaction between the crosslinking agent and the copolymer in accordance with the invention to produce a crosslinked polymer. With some crosslinking agents, visible or UV light may be used to promote reaction between the cross-linking agent and the copolymer.

The crosslinked vinyl fluoride copolymer provided by the present invention typically has a three-dimensional network structure formed by the crosslinking agent reacting with functional groups on different polymer chains and with other function groups on the same polymer chain.

The invention also employs crosslinkable vinyl fluoride compolymers having units derived from at least two monomers selected from (b) which provide functional groups which are capable of cross-linking with each other, i.e., a self-crosslinking copolymer. For example, a copolymer having both hydroxy groups and carboxylic acid group may be self-crosslinked by heat treatment to form ester groups in a condensation reaction. Similarly, copolymer having both hydroxy groups and a blocked isocyanate group may be self-crosslinked by heat treatment.

Pigments and Fillers

If desired, various color, opacity and/or other property effects can be achieved by incorporating pigments and fillers into the fluoropolymer coating composition during manufacture. In one embodiment, pigments are used in amounts of about 1 to about 35 wt % based on fluoropolymer solids. Typical pigments that can be used include both clear pigments, such as inorganic siliceous pigments (silica pigments, for example) and conventional pigments. Conventional pigments that can be used include metallic oxides such as titanium dioxide, and iron oxide; metal hydroxides; metal flakes, such as aluminum flake; chromates, such as lead chromate; sulfides; sulfates; carbonates; carbon black; silica; talc; china clay; phthalocyanine blues and greens, organo reds; organo maroons and other organic pigments and dyes. Preferably, the type and amount of pigment is selected to prevent any significant adverse affects on the desirable properties of fluoropolymer coating, e.g., weatherability, as well as being selected for stability at elevated processing temperature may be used during film formation.

Pigments can be formulated into a millbase by mixing the pigments with a dispersing resin that may be the same as or compatible with the fluoropolymer composition into which the pigment is to be incorporated. Pigment dispersions can be formed by conventional means, such as sand grinding, ball milling, attritor grinding or two-roll milling. Other additives, while not generally needed or used, such as fiber glass and mineral fillers, anti-slip agents, plasticizers, nucleating agents, and the like, can be incorporated.

UV Additives and Thermal Stabilizers

The fluoropolymer coating compositions may contain one or more light stabilizers as additives. Light stabilizer additives include compounds that absorb ultraviolet radiation such as hydroxybenzophenones and hydroxybenzotriazoles. Other possible light stabilizer additives include hindered amine light stabilizers (HALS) and antioxidants. Thermal stabilizers can also be used if desired.

Barrier Particles

If desired, the fluoropolymer coating composition may include barrier particles which decrease permeability of water, solvent and gases through the vinyl fluoride copolymer coating. In a specific embodiment, the particles are platelet-shaped particles. Such particles tend to align during application of the coating and, since water, solvent and gases such as oxygen cannot pass readily through the particles themselves, a mechanical barrier is formed in the resulting coating which reduces permeation of water, solvent and gases. In a photovoltaic module, for example, the barrier particles substantially increase the moisture barrier properties of the fluoropolymer and enhance the protection provided to the solar cells. In some embodiments, barrier particles are present in the amount of about 0.5 to about 10% by weight based on the total dry weight of the fluoropolymer composition in the coating.

Examples of typical platelet shaped filler particles include mica, glass flake and stainless steel flake, and aluminum flake. In one embodiment, the platelet shaped particles are mica particles, including mica particles coated with an oxide layer such as iron or titanium oxide. In some embodiments, these particles have an average particle size of about 10 to 200 µm, in more specific embodiments 20 to 100 µm, with no more than 50% of the particles of flake having average particle size of more than about 300 µm. The mica particles coated with an oxide layer are described in U.S. Pat. Nos. 3,087,827 (Klenke and Stratton); 3,087,828 (Linton); and 3,087,829 (Linton). The micas described in these patents are coated with oxides or hydrous oxides of titanium, zirconium, aluminum, zinc, antimony, tin, iron, copper, nickel, cobalt, chromium, or vanadium. Mixtures of coated micas can also be used.

Liquid Fluoropolymer Coating Composition Formulation

The fluoropolymer liquid coating compositions may contain the vinyl fluoride copolymer either in the form of a solution or dispersion. Typical solutions or dispersions for the vinyl fluoride copolymer are prepared using solvents which have boiling points high enough to avoid bubble formation during the film forming/drying process. For copolymers in dispersion form, a solvent which aids in coalescence of the vinyl fluoride copolymer is desirable. The vinyl fluoride copolymer concentration in these solutions or dispersions is adjusted to achieve a workable viscosity of the solution and will vary with the particular polymer, the other components of the composition, and the process equipment and conditions used. In one embodiment, for solutions the vinyl fluoride copolymer is present in an amount of about 10 wt % to about 25 wt % based on the total weight of the composition. In another embodiment, for dispersions, the vinyl fluoride copolymer is present in an amount of about 25 wt % to about 50 wt % based on the total weight of the liquid composition.

To prepare the fluoropolymer liquid coating composition in dispersion form, the vinyl fluoride copolymer, the cross-linking agent, and, optionally one or more dispersants and/or pigments, may be milled together in a suitable solvent. Alternatively, the various components are milled or appropriately mixed separately. Components which are soluble in the solvent do not require milling.

A wide variety of mills can be used for the preparation of the dispersion. Typically, the mill employs a dense agitated grinding medium, such as sand, steel shot, glass beads, ceramic shot, Zirconia, or pebbles, as in a ball mill, an ATTRI-TOR® available from Union Process, Akron, Ohio, or an agitated media mill such as a "Netzsch" mill available from Netzsch, Inc., Exton, Pa. The dispersion is milled for a time sufficient to cause deagglomeration of the PVF. Typical residence time of the dispersion in a Netzsch mill ranges from thirty seconds up to ten minutes.

If employed, the crosslinking agent is employed in the liquid coating composition at a level sufficient to provide the desired cross-linking of the vinyl fluoride copolymer. In one embodiment of the invention, the liquid coating composition contains about 50 to about 400 mole % cross-linking agent per molar equivalent of cross-linkable vinyl fluoride copolymer.

Polymeric Substrate Films

Polymeric substrate films used in this invention may be selected from a wide number of polymers, with thermoplastics being desirable for their ability to withstand higher processing temperatures. The polymeric substrate film comprises functional groups on its surface that interact with the vinyl fluoride copolymer and, if cross-linked, the cross-linking agent, or both, to promote bonding of the fluoropolymer coating to the substrate film. Preferred polymeric substrate films are polyester, polyamide or polyimide. In a specific embodiment, a polyester for the polymeric substrate film is selected from polyethylene terephthalate, polyethylene naphthalate and a coextrudate of polyethylene terephthalate/polyethylene naphthalate.

Fillers may also be included in the substrate film, where their presence may improve the physical properties of the substrate, for example, higher modulus and tensile strength. They may also improve adhesion of the fluoropolymer to the substrate film. One exemplary filler is barium sulfate, although others may also be used.

The surface of the polymeric substrate film which is to be coated may naturally possess functional groups suitable for bonding as in hydroxyl and/or carboxylic acid groups in a polyester film or amine and/or acid functionality in a polyamide film. The presence of these intrinsic functional groups on the surface of a polymeric substrate film clearly provide commercial benefits by simplifying the process of bonding a coating onto the polymeric substrate film to form a multilayer film. The vinyl fluoride copolymer in the fluoropolymer coating composition may take advantage of the intrinsic functionality of the polymeric substrate film. In this way, an unmodified polymeric substrate film can be chemically bonded to a fluoropolymer coating (i.e., without the use of separate primers or adhesives) to form a fluoropolymer film with excellent adhesion. Preferably, crosslinking agents are employed to crosslink the vinyl fluoride copolymer when polymeric substrate films are used without separate primers or adhesive layers on the substrate.

Many polymeric substrate films may need or would further benefit from the formation of additional functional groups suitable for bonding to the fluoropolymer coating, however, and this may be achieved by surface treatment, or surface activation. That is, the surface can be made more active by forming functional groups of carboxylic acid, sulfonic acid, aziridine, amine, isocyanate, melamine, epoxy, hydroxyl, anhydride and/or combinations thereof on the surface. In one embodiment, the surface activation can be achieved by chemical exposure, such as to a gaseous Lewis acid such as $BF_3$ or to sulfuric acid or to hot sodium hydroxide. Alternatively, the surface can be activated by exposing one or both surfaces to an open flame while cooling the opposite surface. Surface activation can also be achieved by subjecting the film to a high frequency, spark discharge such as corona treatment or atmospheric nitrogen plasma treatment. Additionally, surface activation can be achieved by incorporating compatible comonomers into the polymeric substrate when forming a film. Those skilled in the art will appreciate the wide variety of processes that may be used to form compatible functional groups on the surface of a polymeric substrate film.

In addition, a primer layer may be applied to the surface of the polymeric substrate film to increase its surface functionality. Suitable primers may include polyamines, polyamides, acrylamide polymers (especially amorphous acrylamides), polyethyleneimines, ethylene copolymers or terpolymers, acid-modified polyolefins (e.g. maleated polyolefins), acrylate or methacrylate polymers (e.g., emulsion polymers), polyester (e.g., dispersions), polyurethanes (e.g., dispersions), epoxy polymers, epoxyacrylic oligomers, and mixtures thereof. An example of this is the introduction of amine functionality by the application of a polyethyleneimine primer coating. A second example is coextrusion of an acid or anhydride functional thermoplastic polymer, such as the polymer sold by the DuPont Company under the trademark BYNEL®, with the base PET substrate. When primers are used on, for example, PET film substrates which are stretched during manufacture, the primer can be applied either before or after the film substrate has been stretched.

Coating Application

The liquid fluoropolymer compositions for making the fluoropolymer coated film in accordance with one aspect of the present invention can be applied as a liquid directly to suitable polymeric substrate films by conventional coating means with no need to form a preformed film. Techniques for producing such coatings include conventional methods of casting, dipping, spraying and painting. When the fluoropolymer coating contains fluoropolymer in dispersion form, it is typically applied by casting the dispersion onto the substrate film, using conventional means, such as spray, roll, knife, curtain, gravure coaters, or any other method that permits the application of a uniform coating without streaks or other defects. In one embodiment, the dry coating thickness of a cast dispersion is between about 2.5 µm (0.1 mil) and about 250 µm (10 mils), in a more specific embodiment between about 12.5 µm (0.5 mil) to about 125 µm (5 mils).

After application, the solvent is removed, and the fluoropolymer coating adheres to the polymeric substrate film. If a crosslinking agent is used, the vinyl fluoride copolymer is cross-linked. With some compositions in which the fluoropolymer is in solution form, the liquid fluoropolymer coating compositions can be coated onto polymeric substrate films and allowed to air dry at ambient temperatures. Although not generally necessary to produce a coalesced film, heating is generally desirable when crosslinking agent are employed to cross-link the vinyl fluoride copolymer, and to dry the fluoropolymer coating more quickly. Removing of the solvent and cross-linking the vinyl fluoride copolymer (if a crosslinking agent is used) can be achieved in a single heating or by multiple heatings. Drying temperature are in the range of about 25° C. (ambient conditions) to about 200° C. (oven temperature—the film temperature will be lower). The temperature used should be sufficient to promote the interaction of the functional groups vinyl fluoride copolymer and/or cross-linking agent if used with the functional groups of the polymeric substrate film to provide secure bonding of the fluoropolymer coating to the polymeric substrate film. This temperature varies widely with the vinyl fluoride copolymer and cross-linking agent employed and the functional groups of substrate film. The drying temperature can range from room temperature to oven temperatures in excess of that required for the coalescence of fluoropolymers in dispersion form as discussed below.

When the vinyl fluoride copolymer in the composition is in dispersion form, it is necessary for the solvent to be removed and also for the fluoropolymer to be heated to a sufficiently high temperature that the fluoropolymer particles coalesce into a continuous film. In one embodiment, fluoropolymer in the coating is heated to a temperature of about 150° C. to about 250° C. The solvent used desirably aids in coalescence, i.e., enables a lower temperature to be used for coalescence of the fluoropolymer coating than would be necessary with no solvent present. Thus, the conditions used to coalesce the fluoropolymer will vary with the fluoropolymer used, the thickness of the cast dispersion and the substrate film, and other operating conditions.

The fluoropolymer coating composition can be applied to one surface of a polymeric substrate film or to both surfaces of the substrate film. Two-sided coating can be performed simultaneously on both sides of the polymeric substrate film or alternatively, the coated substrate film can be dried, turned to the uncoated side and resubmitted to the same coating head to apply coating to the opposite side of the film to achieve coating on both sides of the film.

Photovoltaic Modules

Fluoropolymer coated films in accordance with the invention are especially useful in photovoltaic modules. A typical construction for a photovoltaic module includes a thick layer of glass as a glazing material. The glass protects solar cells comprising crystalline silicon wafers and wires which are embedded in a moisture resisting plastic sealing compound such as cross-linked ethylene vinyl acetate. Alternatively thin film solar cells can be applied from various semiconductor materials, such as CIGS (copper-indium-gallium-selenide), CTS (cadmium-tellurium-sulfide), a-Si (amorphous silicon) and others on a carrier sheet which is also jacketed on both sides with encapsulant materials. Adhered to the encapsulant is a backsheet. Fluoropolymer coated films in accordance with the invention are useful for such backsheets and provide excellent strength, weather resistance, UV resistance, and moisture barrier properties. Two-sided fluoropolymer coated films in accordance with the invention are especially useful and may be used in place of laminates made with preformed PVF homopolymer film such as those made with a polyethylene terephthalate film sandwiched between two PVF films.

Test Methods

The following tests are used to determine properties of the samples in the present invention.

Melting Points

Melting points of the vinyl fluoride copolymers are measured using a differential scanning calorimeter (Pyris1, made by Perkin Elmer Inc.).

Solubility

The copolymers are dissolved in N-methyl-2-pyrrolidone (NMP) at 50° C. to 70° C. using a water-bath incubator (Model BT-31, made by Yamato Scientific Co. Ltd.)

Tensile Properties

A film is prepared using a 10% solution of the vinyl fluoride copolymers in NMP, and tensile properties are measured using TENSILON (UTM-1T, made by TOYO BALDWIN Co. Ltd.)

EXAMPLES

Examples 1-7, Comparative Example 1

Synthesis of Vinyl Fluoride-Based Copolymers

A horizontal stainless steel autoclave of 7.6 L (2 US gallons) capacity equipped with a stirrer and a jacket is used as a polymerization reactor. Instruments for measuring temperature and pressure and a compressor for supplying the monomer mixtures to the autoclave at a desired pressure are attached to the autoclave.

The autoclave is filled with deionized water containing 15 g of 6,2-TBS (prepared as described in Baker et al., U.S. Pat. No. 5,688,884) to 70 to 80% of its capacity, and is followed by increasing the internal temperature to 90° C. Then, the autoclave is purged of air by pressurizing three times to 3.1 Mpa (450 psig) using nitrogen. After purging, the autoclave is charged with the monomer mixtures having the composition shown in the following Table 1 until the internal pressure reaches 3.1 MPa (450 psig).

TABLE 1

Composition of Pre-charged Monomer (wt %)

| | TFE | VF | PPVE | PEVE | PFBE | EVE-OH |
|---|---|---|---|---|---|---|
| Example 1 | 52.7 | 27.7 | 14.8 | / | | 4.8 |
| Example 2 | 54.1 | 28.4 | / | 12.6 | | 4.9 |
| Example 3 | 51.1 | 26.8 | / | 18.1 | | 3.9 |
| Example 4 | 52.9 | 27.8 | / | 15.0 | | 4.3 |
| Example 5 | 49.7 | 26.2 | / | 19.6 | | 4.5 |
| Example 6 | 62.9 | 35.0 | / | / | 1.6 | 0.5 |
| Example 7 | 57.1 | 30.0 | / | / | 7.8 | 5.1 |
| Comp. Ex. 1 | 60.5 | 33.0 | / | / | 2.1 | / |

An initiator solution is prepared by dissolving 20 g of ammonium persulfate in 1 L of deionized water. This initiator solution is supplied into the reactor at a rate of 25 ml/minute for 5 minutes, and then the rate is lowered and maintained at 1 ml/minute during the reaction. When the internal pressure drops to 3.0 MPa, the makeup monomer mixtures shown in Table 2 are supplied to keep the pressure constant.

TABLE 2

Composition of Makeup Monomer (wt %)

| | TFE | VF | PPVE | PEVE | PFBE | EVE-OH |
|---|---|---|---|---|---|---|
| Example 1 | 54.6 | 34.0 | 7.4 | / | | 4.0 |
| Example 2 | 55.3 | 34.7 | / | 6.0 | | 4.0 |
| Example 3 | 54.8 | 34.2 | / | 8.0 | | 3.0 |
| Example 4 | 54.6 | 34.0 | / | 7.4 | | 4.0 |
| Example 5 | 53.8 | 33.8 | / | 8.9 | | 3.5 |
| Example 6 | 54.0 | 34.0 | / | / | 7.4 | 4.0 |
| Example 7 | 54.8 | 34.4 | / | / | 7.4 | 3.4 |
| Comp. Ex. 1 | 57.4 | 35.2 | / | / | 7.4 | / |

Composition of this makeup supply is different from that of the pre-charged mixture because of different reactivity of each monomer. Since the composition thereof is selected so that the monomer composition in the reactor is kept constant, a product having a uniform composition is obtained.

Monomers are supplied to the autoclave until a solid content in the produced latex reaches about 20%. When the solid content reaches a predetermined value, supply of the monomers is immediately stopped, then the content of the autoclave is cooled and unreacted gases in the autoclave are purged off.

To the resulting latex, 15 g of ammonium carbonate dissolved in water per 1 L of latex and then 70 mL of HFC-4310 (1,1,1,2,3,4,4,5,5,5-decafluoropentane) per 1 L of latex are added while stirring at high speed, followed by isolation of the polymer by filtration. The polymer is washed with water and dried at 90 to 100° C. in a hot-air dryer. Compositions and melting points of the produced polymers are shown in Table 3.

The resulting VF copolymer is dissolved in NMP at 55 to 60° C. using a water-bath incubator and then cooled to room temperature (25° C.), and solubility of the resin, at which a stable clear solution is obtained, is measured. The results are shown in Table 3.

TABLE 3

| | Composition of Polymer (mole %) | | | | | | Melting Point (° C.) | Solubility (in NMP) 25° C. |
|---|---|---|---|---|---|---|---|---|
| | TFE | VF | PPVE | PEVE | PFBE | EVE-OH | | |
| Example 1 | 39.9 | 57.1 | 2.2 | / | | 0.75 | 174 | 8-10% |
| Example 2 | 42.3 | 55.2 | / | 1.7 | | 0.78 | 178 | 8-10% |
| Example 3 | 42.7 | 54.3 | / | 2.5 | | 0.57 | 174 | 8-10% |
| Example 4 | 43.3 | 53.8 | / | 2.2 | | 0.65 | 175 | 8-10% |
| Example 5 | 41.2 | 55.3 | / | 2.83 | | 0.65 | 171 | 10-13% |
| Example 6 | 42.0 | 54.7 | / | / | 2.7 | 0.63 | 173 | 8-10% |
| Example 7 | 42.3 | 55.1 | / | / | 1.97 | 0.59 | 173 | 8-10% |
| Comp. Ex. 1 | 45.2 | 55.4 | / | / | 2.1 | / | 177 | 4-5% |

Examples 8-22

Non-Aqueous Fluoropolymer Coating Compositions Containing Crosslinking Agent

Resin solutions are prepared by dissolving the vinyl fluoride-based copolymers synthesized in Examples 1-7 at 50 to 70° C. in N-methyl-2-pyrrolidone. Titanium acetylacetonate (TYZOR® AA 75, made by DuPont Co.) is selected as a cross-linking agent. This cross-linking agent is dissolved in N-methyl-2-pyrrolidone to provide a 10% solution.

The above solution of the cross-linking agent, titanium acetylacetonate, is added to the resin solution in amounts of 1%, 3% and 5% (% is by weight relative to the vinyl fluoride-based copolymer resin), and mixed uniformly. The compositions are described in Table 4.

TABLE 4

|  | Vinyl Fluoride Copolymer Resin | Amount of Cross-linking Agent used (C.A./Resin wt %) |
|---|---|---|
| Example 8 | Derived from Ex. 1 | 1 |
| Example 9 | Derived from Ex. 2 | 1 |
| Example 10 | Derived from Ex. 3 | 1 |
| Example 11 | Derived from Ex. 4 | 1 |
| Example 12 | Derived from Ex. 5 | 1 |
| Example 13 | Derived from Ex. 1 | 3 |
| Example 14 | Derived from Ex. 2 | 3 |
| Example 15 | Derived from Ex. 3 | 3 |
| Example 16 | Derived from Ex. 4 | 3 |
| Example 17 | Derived from Ex. 5 | 3 |
| Example 18 | Derived from Ex. 1 | 5 |
| Example 19 | Derived from Ex. 2 | 5 |
| Example 20 | Derived from Ex. 3 | 5 |
| Example 21 | Derived from Ex. 4 | 5 |
| Example 22 | Derived from Ex. 5 | 5 |

Examples 23-25

Tensile Properties of Vinyl Fluoride-Based Copolymer Films

Examples 23-25 illustrate tensile strengths and elongations at break measured by TENSILON of VF copolymer films prepared from the coating compositions of Examples 12, 17 and 22.

The coating compositions with the cross-linking agent are put into an aluminum cup (No. 107, made by AS ONE Corp.) and subjected to drying and cross-linking at 150° C. for 2 hours in a vacuum dryer (LCV-232, made by TABAI ESPEC Corp.) After cooling to room temperature, adhesiveness of the resulting resin film are pealed off of the aluminum substrate. Tensile testing results are shown in Table 5.

TABLE 5

|  | Width Mm | C.S. Area mm² | Maximum Stress MPa | Stress at Upper Yield Point MPa | Elong. at Break % GL | Elastic Modulus MPa | Proof Strength (1)MPa |
|---|---|---|---|---|---|---|---|
| Ex. 23 | 4.95 | 0.35 | 31.856 | 20.54 | 379.5 | 645.71 | 12.468 |
| Ex. 24 | 4.95 | 0.30 | 29.032 | 22.869 | 299.18 | 743.53 | 13.826 |
| Ex. 25 | 4.95 | 0.30 | 31.256 | 21.913 | 328.45 | 709.64 | 15.53 |

C.S. Area: Cross-sectional Area; Elong.: Elongation

As shown in Table 5, it is found that the cross-linked resins of the invention have good mechanical properties such as high maximum stress and elongation at break values.

Examples 26-28

Aqueous Fluoropolymer Coating Compositions Containing Crosslinking Agent

Using the same or similar conditions as in Examples 1-7, several aqueous dispersions of crosslinkable vinyl fluoride-based copolymers having the polymer compositions shown in Table 6 are prepared and examined. The aqueous dispersions and the cross-linking agents (melamine resin, Cymel 350, CYTEC INDUSTRIES INC.) are mixed uniformly. The mixtures are put into aluminum cups (No. 107, made by AS ONE Corp.) and subjected to drying and cross-linking at 190° C. for 5 hours in a vacuum dryer. After cooling to room temperature, the resulting coatings are evaluated by visual observation. The results are shown in Table 6.

TABLE 6

|  | Composition of Polymer (mole %) | | | | Amount of Cross-linking Agent used (C.A./Resin wt %) | Thermo-stability |
|---|---|---|---|---|---|---|
|  | TFE | VF | PEVE | PSEPVE | | |
| Ex. 26 | 34.7 | 64.1 | 1.0 | 0.1 | 10 | Good |
| Ex. 27 | 32.7 | 66.7 | 0.6 | 0.1 | 10 | Good |
| Ex. 28 | 51.0 | 45.0 | 2.3 | 2.0 | 10 | Good |

C.A.: Cross-linking Agent. (melamine resin, Cymel 350, CYTEC INDUSTRIES INC.)
Good: No separation and carbonization.

Examples 29-33

Fluoropolymer Coated PET Films

One-sided fluoropolymer coated polyethylene terephthalate are produced by coating the non-aqueous fluoropolymer coating compositions of Examples 18-22 onto unmodified polymeric substrate films. The fluoropolymer coating are made by drawing down the coating compositions on an unmodified 3 mil Melinex® 442 PET film (DuPont Teijin Films) using a 12 mil draw down knife and baking in a 220° C. oven. The fluoropolymer coating films are inspected visually and a good quality coating results.

TABLE 7

|  | Vinyl Fluoride Copolymer Coating Composition | Coating Quality on Unmodified PET |
|---|---|---|
| Example 29 | Example 18 | Good |
| Example 30 | Example 19 | Good |
| Example 31 | Example 20 | Good |
| Example 32 | Example 21 | Good |
| Example 33 | Example 22 | Good |

Good: Uniform, well-adhered coating

What is claimed is:
1. A fluoropolymer coated film comprising:
a polymeric substrate film; and
a fluoropolymer coating on said polymeric substrate film, said fluoropolymer coating comprising a vinyl fluoride copolymer comprised of about 50 to about 69.9 mole % of repeat units derived from vinyl fluoride and about 30 to about 50 mole % of repeat units derived from monomer selected from a mixture of (a) and (b) below, with the proviso that at least about 30 mole % of repeat units in said copolymer are derived from (a), and about 0.1 mole % to about 20 mole % of repeat units in said copolymer are derived from monomer selected from (b):

(a) tetrafluoroethylene; and (b) fluorinated vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide, wherein the functional groups of the vinyl fluoride copolymer provide crosslinkable reaction sites, and wherein said polymeric substrate film comprises functional groups that interact with the functional groups of the vinyl fluoride copolymer to promote bonding of the fluoropolymer coating to the polymeric substrate film, and wherein said vinyl fluoride copolymer coating is cross-linked.

2. The fluoropolymer coated film of claim 1 wherein said vinyl fluoride copolymer further comprises about 0.1 to about 10 mole % of repeat units derived from monomer (c) selected from the group consisting of fluorinated vinyl ethers, fluorinated alkyl (meth)acrylates, perfluoroolefins having 3-10 carbon atoms, perfluoro C1-C8 alkyl ethylenes, fluorinated dioxoles and mixtures thereof.

3. The fluoropolymer coated film of claim 1 wherein monomer (b) comprises fluorinated vinyl ether monomer containing said at least one functional group.

4. The fluoropolymer coated film of claim 1 wherein said vinyl fluoride copolymer further comprises about 0.1 to about 10 mole % units derived from at least one monomer selected from fluorinated vinyl ethers and perfluoro C1-C8 alkyl ethylenes.

5. The fluoropolymer coated film of claim 1 wherein said fluoropolymer coating further comprises pigment.

6. The fluoropolymer coated film of claim 1 wherein said fluoropolymer coating is on both sides of said polymeric substrate film.

7. The fluoropolymer coated film of claim 1 wherein the polymeric substrate film is selected from polyester, polyamide, and polyimide.

8. The fluoropolymer coated film of claim 1 wherein said substrate film is polyester.

9. The fluoropolymer coated film of claim 1 wherein said substrate film is selected from the group consisting of polyethylene terephthalate and polyethylene naphthalate.

10. The fluoropolymer coated film of claim 1 wherein said fluoropolymer coating has a thickness of about 2.5 μm to about 250 μm (about 0.1 to about 10.0 mils).

11. The fluoropolymer coated film of claim 1 wherein said polymeric substrate film has a thickness of about 12.5 μm to about 250 μm (about 0.5 to about 10 mils).

12. The fluoropolymer coated film of claim 1 wherein said polymeric substrate film further comprises filler.

13. The fluoropolymer coated film of claim 1 wherein said polymeric substrate film comprises a primer layer on its surface providing said functional groups that interact with said functional groups of said vinyl fluoride copolymer to promote bonding of said fluoropolymer coating to said substrate film.

14. The fluoropolymer coated film of claim 1 wherein the surface of said polymeric substrate film is activated.

15. The fluoropolymer coated film of claim 1 wherein the vinyl fluoride copolymer has a melting point of about 171° C. to about 178° C.

16. A process for forming a fluoropolymer coated film comprising:

coating a polymeric substrate film with a liquid fluoropolymer coating composition, wherein said liquid fluoropolymer coating composition comprises a liquid medium, cross-linking agent, and dispersed or dissolved vinyl fluoride copolymer comprised of about 50 to about 69.9 mole % of repeat units derived from vinyl fluoride and about 30 to about 50 mole % of repeat units derived from monomer selected from a mixture of (a) and (b) below, with the proviso that at least about 30 mole % of repeat units in said copolymer are derived from (a), and about 0.1 mole % to about 20 mole % of repeat units in said copolymer are derived from monomer selected from (b):

(a) tetrafluoroethylene; and (b) fluorinated vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide, wherein the functional groups of the vinyl fluoride copolymer provide crosslinkable reaction sites, and wherein said polymeric substrate film comprises functional groups that interact with the functional groups of the vinyl fluoride copolymer to promote bonding of the fluoropolymer coating to the polymeric substrate film, and removing the liquid medium from the fluoropolymer coating and cross-linking said vinyl fluoride copolymer.

17. The process of claim 16 wherein the vinyl fluoride copolymer has a melting point of about 171° C. to about 178° C.

18. The process for forming a fluoropolymer coated film of claim 16 wherein said liquid fluoropolymer coating composition comprises dispersed vinyl fluoride copolymer, and wherein the liquid fluoropolymer coating composition coated on the polymeric substrate film is heated to coalesce the fluoropolymer coating into a continuous coated film.

19. The process for forming a fluoropolymer coated film of claim 18 wherein said liquid fluoropolymer coating composition is heated to a temperature of about 150° C. to 250° C. to coalesce the fluoropolymer coating into a continuous film.

20. A backsheet for a photovoltaic module comprising:

a polymeric substrate film; and a fluoropolymer coating on said polymeric substrate film, said fluoropolymer coating comprising a vinyl fluoride copolymer comprised of about 50 to about 69.9 mole % of repeat units derived from vinyl fluoride and about 30 to about 50 mole % of repeat units derived from monomer selected from a mixture of (a) and (b) below, with the proviso that at least about 30 mole % of repeat units in said copolymer are derived from (a), and about 0.1 mole % to about 20 mole % of repeat units in said copolymer are derived from monomer selected from (b):

(a) tetrafluoroethylene; and (b) fluorinated vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide, wherein the functional groups of the vinyl fluoride copolymer provide crosslinkable reaction sites, and wherein said polymeric substrate film comprises functional groups that interact with the functional groups of the vinyl fluoride copolymer to promote bonding of the fluoropolymer coating to the polymeric substrate film, and wherein said vinyl fluoride copolymer coating is cross-linked.

21. A photovoltaic module comprising the backsheet of claim 20 adhered to solar cells wherein said fluoropolymer coating is a surface layer of the backsheet.

* * * * *